United States Patent
Del Prado Pavon et al.

(10) Patent No.: US 7,724,713 B2
(45) Date of Patent: May 25, 2010

(54) BEACONING PROTOCOL FOR AD-HOC NETWORKS

(75) Inventors: Javier Del Prado Pavon, Ossining, NY (US); Amjad Soomro, Hopewell Junction, NY (US); Sai Shankar Nandagopalan, Tarrytown, NY (US); Zhun Zhong, Croton-on-Hudson, NY (US); Kiran Challapali, New City, NY (US); Joerg Habetha, Aachen (DE); Guido Hiertz, Cologne (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 959 days.

(21) Appl. No.: 10/597,391

(22) PCT Filed: Feb. 2, 2005

(86) PCT No.: PCT/IB2005/050441

§ 371 (c)(1), (2), (4) Date: Jul. 24, 2006

(87) PCT Pub. No.: WO2005/076543

PCT Pub. Date: Aug. 18, 2005

(65) Prior Publication Data

US 2008/0247376 A1 Oct. 9, 2008

Related U.S. Application Data

(60) Provisional application No. 60/542,530, filed on Feb. 6, 2004, provisional application No. 60/581,581, filed on Jun. 21, 2004.

(51) Int. Cl.
H04W 4/00 (2009.01)
H04B 7/212 (2006.01)
H04J 3/00 (2006.01)

(52) U.S. Cl. .................. 370/338; 370/329; 370/337; 370/345

(58) Field of Classification Search ............ 379/318; 455/574, 426.1, 332, 450, 456.1; 370/338, 370/329, 337, 345, 318, 346, 449, 311, 222; 375/132

See application file for complete search history.

(56) References Cited

U.S. PATENT DOCUMENTS

| | | |
|---|---|---|
| 2003/0012176 A1 | 1/2003 | Kondylis |
| 2003/0114204 A1* | 6/2003 | Allen et al. ............ 455/574 |
| 2003/0231607 A1 | 12/2003 | Scanlon |
| 2007/0105548 A1* | 5/2007 | Mohan et al. .......... 455/426.1 |

* cited by examiner

Primary Examiner—Thjuan K Addy
(74) Attorney, Agent, or Firm—Larry Liberchuk

(57) ABSTRACT

A distributed MAC protocol that includes a super-frame having a slotted Beaconing Period and a data transfer period. The super-frame includes a plurality of medium access slots which are assigned to the slotted Beaconing Period. The Beaconing Period length may be fixed or variable. The Beaconing protocol defines initializing an ad hoc network by means of starting a Beaconing Period, joining an existing Beaconing Period of ad hoc network and resolving collisions during the Beaconing Period.

19 Claims, 6 Drawing Sheets

BEACONING PROTOCOL FOR AD-HOC NETWORKS

This application claims the benefit of U.S. Provisional Application Ser. No. 60/542,530 filed Feb. 6, 2004 and U.S. Provisional Application Ser. No. 60/581,581 filed Jun. 21, 2004 both of which are incorporated herein by reference.

The present invention relates to a system and method for a Beaconing Protocol for ad-hoc networks.

Wireless LANs are increasing in popularity and in order to support demand for different types of services over the one wireless medium, several MAC layer solutions have evolved including legacy IEEE 802.11 and IEEE 802.11e. As a result several communication protocols exist to support ad-hoc connectivity in wireless networks, such as IEEE 802.11 IBSS or IEEE 802.15 family of protocols. These protocols are specified in the: IEEE Std. 802.11-1999 (Reaff 2003), Part 11: Wireless LAN Medium Access Control (MAC) and Physical Layer (PHY) Specifications, edition 2003, and the IEEE Std.802.15.3-2003, Part 15.3: Wireless Medium Access Control (MAC) and Physical Layer (PHY) Specification for High Rate Wireless Personal Area Networks (WPANs), edition 2003, which are hereby incorporated by reference in their entirety.

The IEEE 802.11 standard defines two basic functions for wireless medium access: the Point Coordination Function (PCF) and the Distributed Coordination Function (DCF). DCF is responsible for asynchronous data services and handles the contention period during which sending stations contend with one another for access using the medium access scheme carrier sense multiple access with collision avoidance (CSMA/CA).

Wireless personal area networks (WPANs) communicate among contending nodes that are closer to one another than in a typical wireless local area network (WLAN). WPANs may have a need for a zero infrastructure environment.

The MultiBand OFDM Alliance (MBOA) is also defining a MAC protocol for WPANs, see MBOA Wireless Medium Access Control (MAC) Specification For High Rate Wireless Personal Area Networks (WPANs), Technical Specification, Draft 0.5, April 2004, which is hereby incorporated by reference in its entirety. The MBOA MAC protocol is distributed, i.e., peer devices have the same protocol behavior and hardware/software capabilities. The MBOA MAC is based on medium reservations by the devices, thus eliminating sensing and collisions times on the medium. Further, the MBOA MAC protocol eliminates any need for a network infrastructure by distributing functions across all nodes (devices) of a wireless personal area network (WPAN), and is based on enhanced distributed channel access (EDCA) mode of operation of IEEE 802.11e. In the MBOA distributed MAC protocol there is no access point or central coordinator for a WPAN network. Synchronous, asynchronous, and isochronous data transfer is supported in the MBOA distributed MAC protocol.

Isochronous is time-dependent data transfer where there are certain time constraints placed on the delivery of data. For example, an isochronous transport mechanism is required by multimedia streams to guarantee that data is delivered as fast as it is displayed and to ensure that the audio is synchronized with the video. By contrast, asynchronous processes comprise data streams that can be separated by random intervals, and synchronous processes, comprise data streams that must be delivered only at pre-determined regularly spaced intervals. The time constraints of isochronous service are not as stringent as those of synchronous service, but are not as lenient as asynchronous service.

Two major problems yet to be resolved are power management and synchronization. For example, a device should be able to go to sleep when traffic addressed to it is not expected. The mechanism provided in IEEE 802.11 IBSS is very inefficient and is deficient in efficiently synchronizing devices. In particular, it assumes that all devices hear each other when this is not always the case.

There is a need for a distributed MAC protocol that provides both efficient power management and synchronization, and allows for distributed time reservation of the medium.

Referring now to FIG. 1, the present invention provides a distributed MAC protocol comprising a superframe structure 102, and procedures for using this superframe structure 102 that, among other advantages, enhances power management and synchronization in ad-hoc networks. According to the present invention, the MAC superframe structure provided includes a slotted Beaconing Period BP 104 comprising a plurality of MAS slots 107, and a data transfer period 103. All ad-hoc network devices participate in sending Beacons. Medium access in a MAS of the data transfer period is based on an enhanced distributed channel access or EDCA-like mechanism, or a distributed reservation mechanism.

The technique employed to maintain coordination between communicating devices in an ad hoc network according to the present invention, is periodic transmission of a Beacon. Beacons provide the basic timing for the network including information regarding isochronous reservations. Devices that wish to communicate must belong to the same Beacon Group or set of devices that are within radio range of a given device and that Beacon during the same Beacon Period (BP).

Referring again to FIG. 1, in the MBOA distributed MAC protocol of the present invention each superframe 102 comprises a plurality of medium access slots (MAS) 107. The MAS are divided between Beacon Period 104 and data transfer period 103, see also FIG. 2b. In order to transmit/receive Beacons, devices designate a period of time corresponding to a contiguous set 104 of MAS slots 107 as a Beacon Period (BP) 104 that is strictly reserved for Beacon transmission and reception. The group of devices that share this Beacon airtime or BP 104 is termed a Beacon Group. That is, a Beacon Group is defined locally with respect to a given device as a set of devices that synchronize their Beacon transmissions within the same subset of medium access slots (MAS) 107 and that identify this subset 104 of MAS slots 107 as their BP 104. According to the MBOA specification, a BP 104 is defined as eight contiguous MAS slots designated by the Beacons of one or more devices as the BP or slotted Beaconing Period 104. According to a preferred embodiment the number of MAS slots 107 assigned to the BP 104 may be fixed, for example to be 8 MAS slots, or variable. The MBOA specifies the BP 104 as having 24 Beacon slots, equivalent to eight MAS slots wherein each MAS comprises three Beacon slots, see FIG. 2a. The number of Beacon slots can be variable, and not fixed depending on the number of MAS slots 107 assigned to the BP.

A Cluster is a set of devices within the radio range of a device and includes all devices within a Beacon Group. A Cluster may also include devices within the radio range that belong to another Beacon Group.

Thus, the BP length 106 may be fixed or variable. If it is fixed, the corresponding fixed number of Beacon slots 105 determines the maximum number of devices that can operate simultaneously in the same location and frequency. However, the Beacon slot length 202 is fixed and depends on the Beacon Frame length, i.e., the time required to transmit a Beacon Frame.

Other features and advantages of the present invention will be obvious from the following drawings and detailed description of the invention.

Figure 2A:
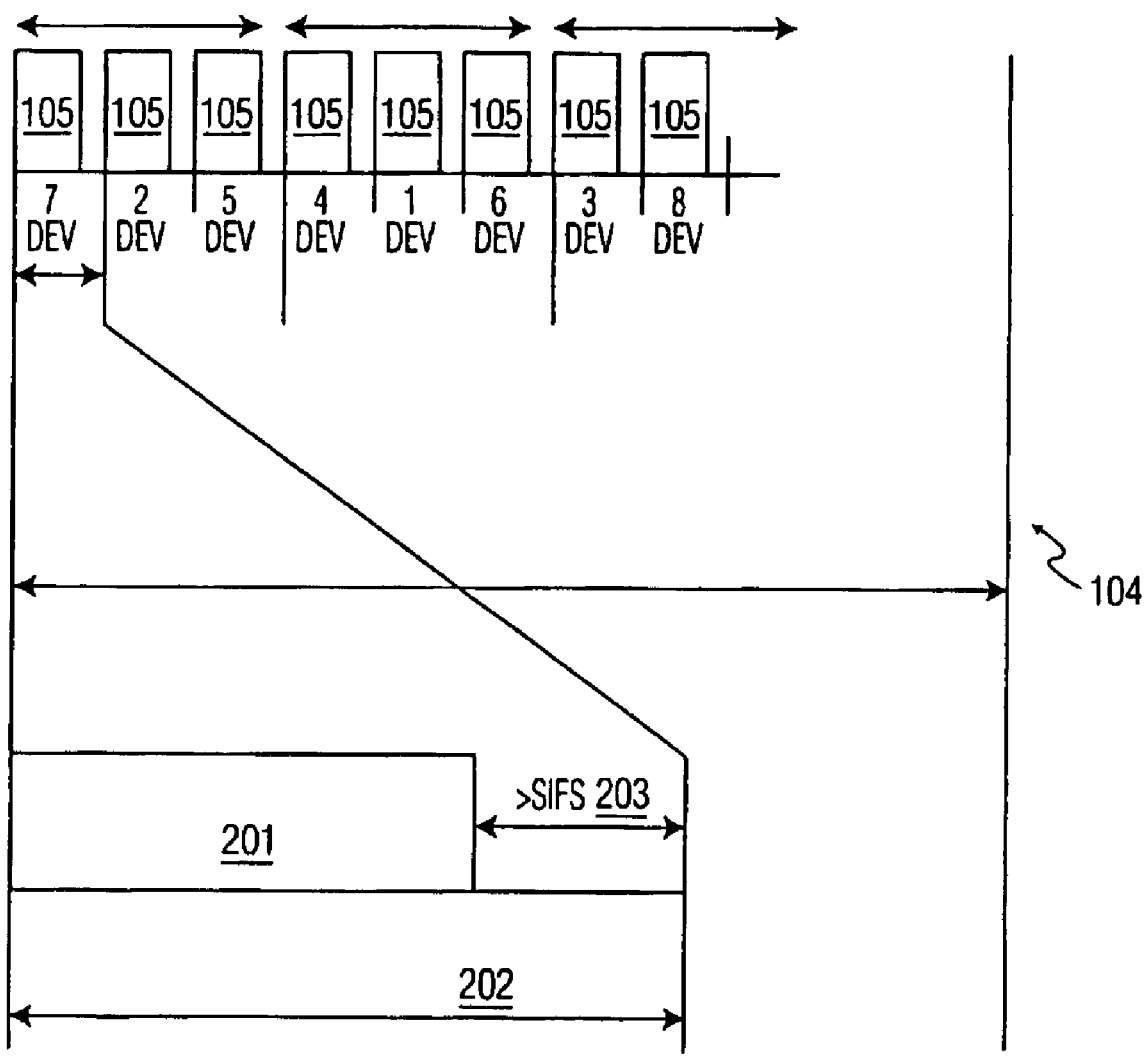
FIG. 2a illustrates a slotted Beaconing Period, according to the present invention, wherein a MAS comprises three Beacon slots.
Figure 2B:
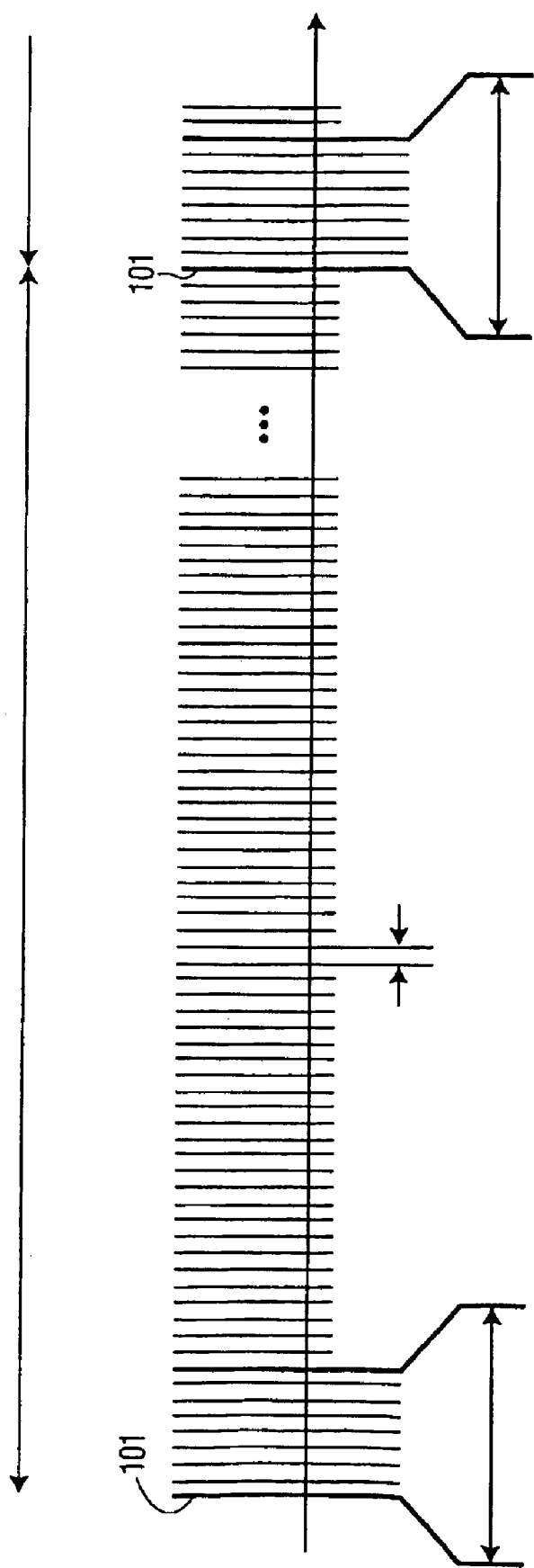
Figure 3:
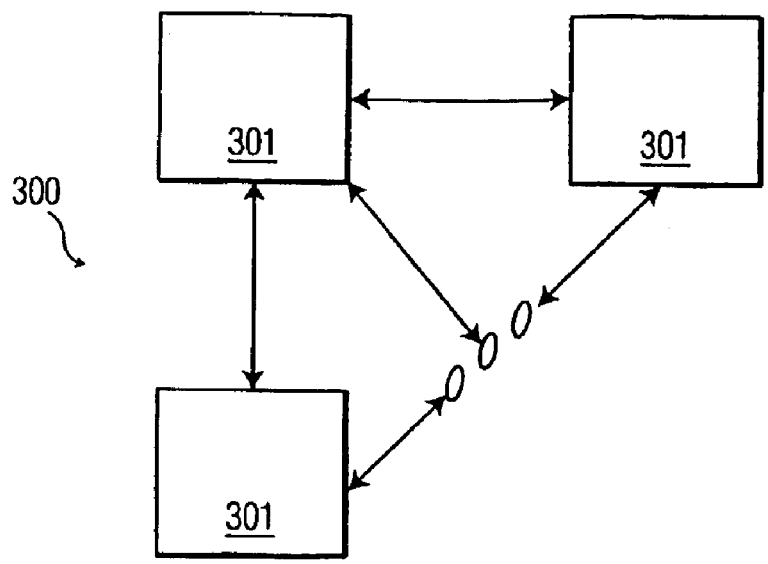
Figure 4:
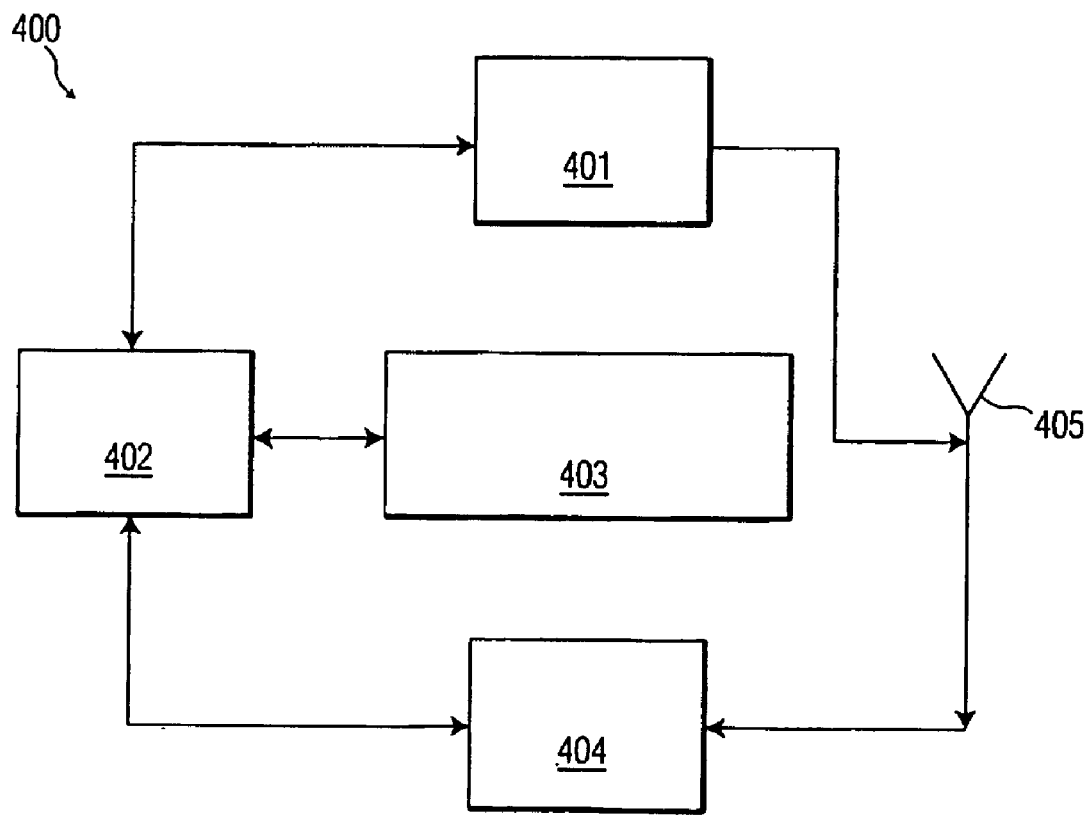

FIG. 2b illustrates a superframe, according to the present invention, comprising a plurality of MAS slots that are divided into a Beacon Period and data transfer period FIG. 3 illustrates an architecture of a wireless communication system whereto embodiments of the present invention are to be applied; and FIG. 4 illustrates a simplified block diagram of a wireless device of the communication system of FIG. 3 according to an embodiment of the present invention.

Figure 5:
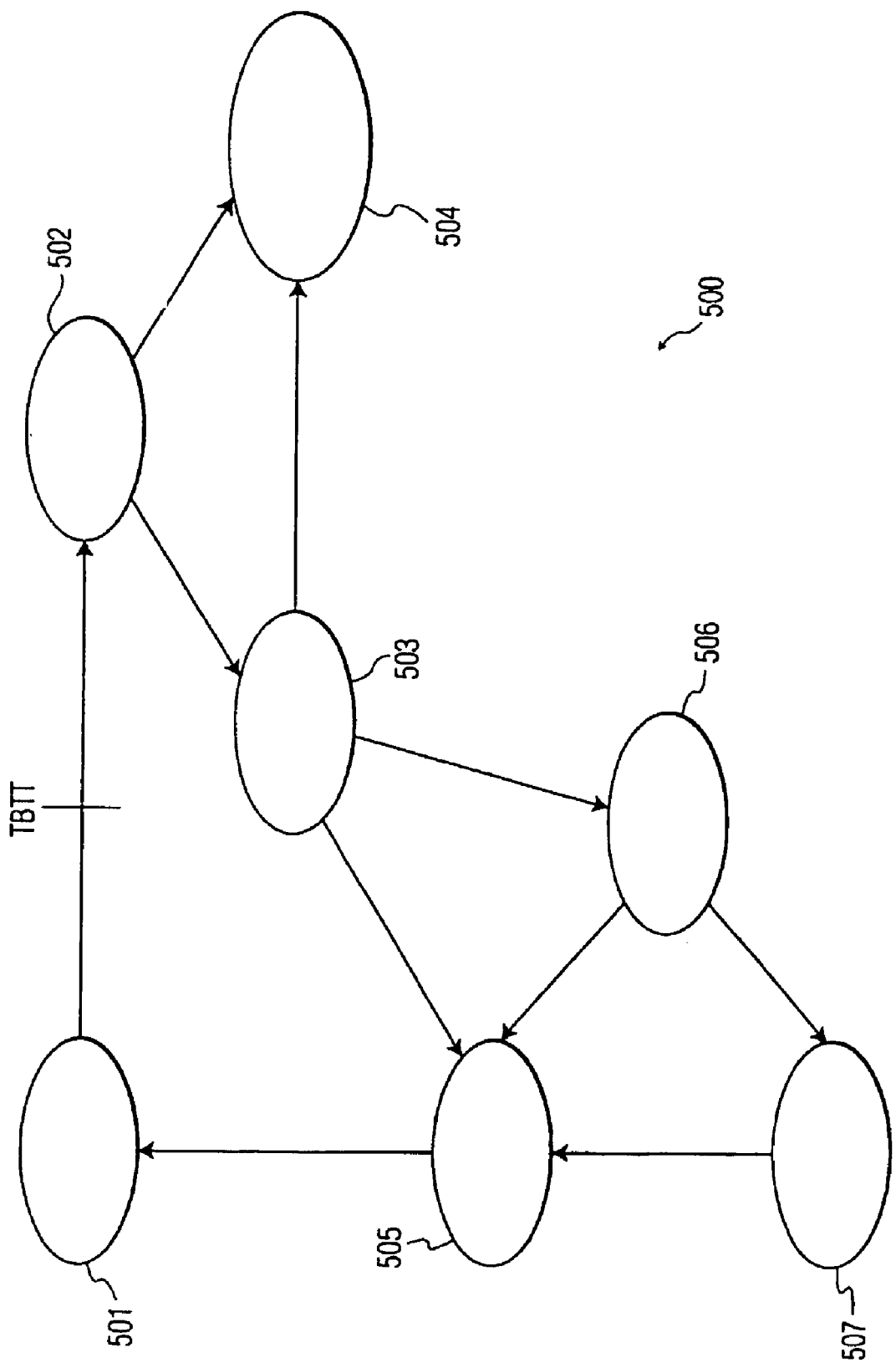

FIG. 5 illustrates a Finite State Diagram (FSD) for the synchronization functionality of the Beaconing protocol.

Figure 6:
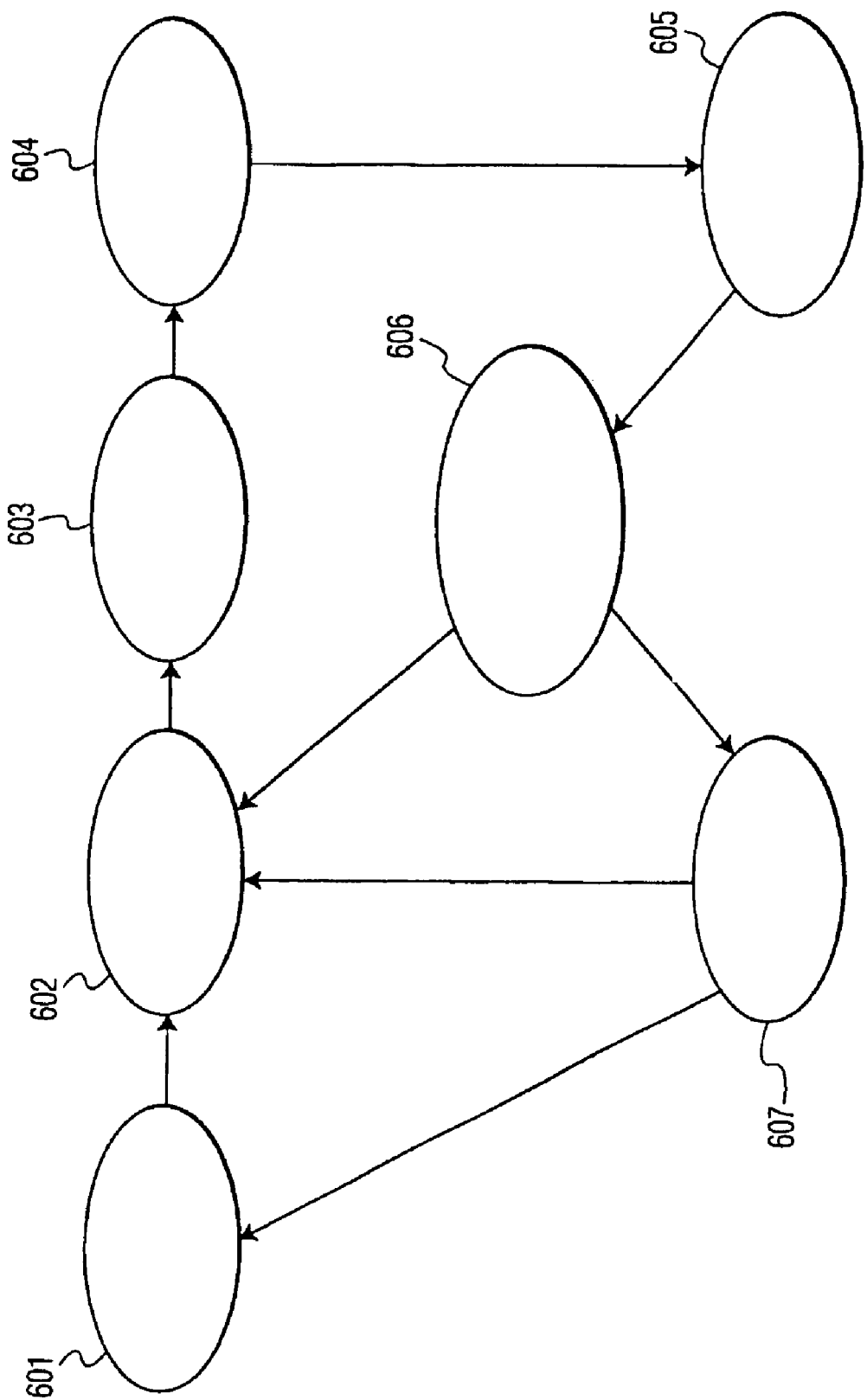

FIG. 6 illustrates a Finite State Diagram (FSD) for the Beacon collision and resolution protocol (BCRP) during the Beaconing Period.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

Figure 1:
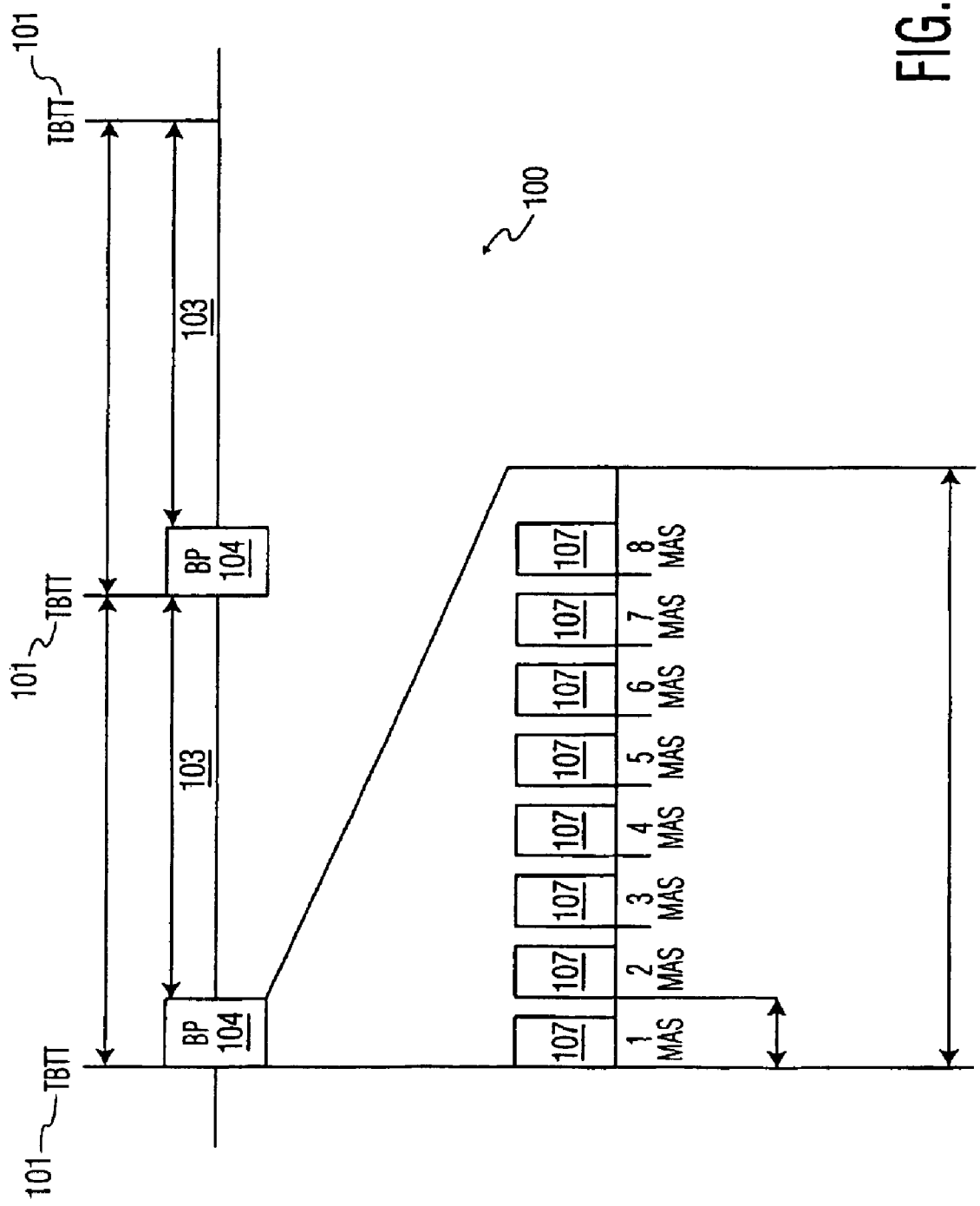
FIG. 1 illustrates a superframe structure according to the present invention.

The present invention relates to ad-hoc networks in which the channel time is divided into superframes, with each superframe beginning with a BP. The BP is used for sending Beacons. FIG. 1 illustrates a MAC superframe structure 100 according to the present invention. In an ad-hoc network all devices participate in sending Beacons. Each MAC superframe structure 100 comprises a sequence of at least one superframe 102 further comprising a slotted BP 104 that begins at TBTT or Beaconing Period Start Time (BPST) 101 and continues for a slotted BP Length 106 and that includes a plurality of Beacon slots 105 so that new devices may join the network, said slotted BP 104 being followed by a data transfer period 103. The BP Length 106 may be fixed or variable.

As illustrated in FIG. 2a, the time between each contiguous Beacon slot 105 is greater than a short inter frame space (SIFS) 203. The MAS slot 107 is the basic unit of communication. As illustrated in FIG. 2b, a superframe is preferably divided into 256 MAS slots 107. Each MAS is 256 usec in length resulting in a superframe length of 65 msec. A MAS slot 107 can be used for EDCA, DRP (distributed reservation protocol for data transfer) or Beaconing. Several MAS slot types are defined depending on how the MAS slot 107 is utilized by the device or devices nearby. Table 1 summarizes the MAS slot types.

TABLE 1

Media Access Slot Type Definition

| MAS type | Number of MAS | Notes |
| --- | --- | --- |
| Beacon Period | Variable, >1, preferably 8 | Slots reserved for Beacon transmission |
| EDCA | Variable, >=1 | Slots utilized for EDCA only |
| DRP | Variable, >=1 | Slots utilized as reserved slots. Several subtypes are defined according to the category of DRPs. |

TABLE 1-continued

Media Access Slot Type Definition

| MAS type | Number of MAS | Notes |
| --- | --- | --- |

Before communication can be established, a device must create its own Beacon group or join an existing Beacon group. For each Beacon Period, preferably eight consecutive MAS slots 107 are utilized as Beacon slots 105, where all the devices, which belong to the Beacon group, transmit Beacons. The start time of the superframe is determined by the beginning of the Beacon Period and defined as the Target Beacon Transmission Time (TBTT) in IEEE 802.11 and Beacon Period Start Time (BPST) in MBOA distributed MAC.

In a preferred embodiment, a Beaconing Period 104 is defined to use eight MAS slots 107. Each MAS slot 107 includes three Beacon slots 107 separated by >SIFS, and therefore, a Beacon Period contains twenty-four Beacon slots 105 in the MBOA distributed MAC. The number of slots can be variable, as already indicated. The slotted BP length 106 can be fixed or variable. If it is fixed, the number of Beacon slots 105 is fixed and determines the maximum number of devices than can operate simultaneously in the same location and frequency. Ultimately, however, the Beacon slot length 202 depends on the length of the Beacon frame.

The superframe 102 of the present invention further includes a data transfer period 103 comprising the remaining MAS slots 107 of the superframe 102, i.e., the MAS slots of the superframe not in the BP 104. During the data transfer period 103 of the superframe 102, devices send and receive data either through a contention-based prioritized channel access called Enhanced Distributed Channel Access (EDCA) or using a reservation based channel access call the Distributed Reservation Protocol (DRP).

A Beacon includes, but is not limited to, information such as:

(1) Identification of device and its capabilities;
(2) Traffic identification map (TIM);
(3) Beacon slot occupancy field;
(4) Related Mesh networks; and
(5) Distributed reservations of the medium.

This information can be transmitted in the form of information elements in the Beacon as specified in the IEEE 802.11 or IEEE 802.15 standards.

The uses of the Beaconing of the present invention include, but are not limited to:

(1) Power management;
(2) Device discovery via fast association;
(3) Multi-hop message routing; and
(4) Synchronization of multiple peer-to-peer pairs
(5) Distributed reservation of the medium.

Power Management: The present invention contributes to power saving by each device. All devices wake up at TBTT or Beacon Period Start Time (BPST) to receive Beacons. Devices with traffic in the queues include the destination devices in the TIM. Devices that receive TIM addressed to them remain awake during the following contention period of the superframe. Devices can go to sleep once the BP of the superframe has finished and the TIM is clear. Devices can also go to sleep before the end of the superframe, once a frame has been received with the "More Data" set to zero.

Device Discovery Via Fast Association: All devices send a Beacon during the Beaconing Period. Devices can be discovered in the time of one superframe once a Beacon has been received.

Multi-hop Message Routing: The Beacons include information regarding the neighborhood of a device. This information, included in the Beacon Period Occupancy Information Element (BPOIE) in the Beacons, can be used to find the shortest or cheapest path to a particular device.

Synchronization: Each device scans the medium for Beacons. If no Beacon is received, the device sets its own TBTT or BPST and transmits a first Beacon. If, however, a Beacon is received, the device looks for an empty slot in the slotted Beacon Period and selects one, if one is available. Once a slot is chosen, the device always sends its Beacon in this same slot, unless a collision is detected. If more than one Beacon is received, then the device synchronizes to the fastest clock.

It may happen that two devices use the same Beacon slot, and therefore a collision detection and resolution mechanism (BCRP) is needed. Devices transmit a "Beacon slot occupancy" field (BPOIE) in their own Beacons:

(1) the "Beacon slot occupancy" field includes information about the slot numbers and the device IDs (DevIDs) of the Beacon received;

(2) if either a given Beacon slot in a received Beacon is detected as idle or a Beacon frame is received incorrectly for at least a predetermined number of times, the "Beacon slot occupancy" field is considered to be empty or does not include information for the given slot;

When a device sending a Beacon receives, for at least a predetermined number of times, "Beacon slot occupancy" field(s) that do not include its own Beacon slot information or include a different DevID in the same slot, the device searches for a new empty Beacon slot.

Distributed Reservation of the medium: A device can announce in its Beacon a particular time reservation of the data transfer period of the superframe. All devices receive this announcement upon reception of the Beacon and, therefore, become aware of the time reservation. Devices do not transmit during the reserved time of neighboring devices.

The system and method of the present invention can be used for wireless personal area networks (WPANs) and local area networks (WLANs) 300 in which wireless devices 301 comprise a MAC module modified according to the present invention. FIG. 3 illustrates a representative wireless network whereto embodiments of the present invention are to be applied. According to the principle of the present invention, there is provided a MAC module 400, see FIG. 4, configured to perform a slotted Beaconing protocol such that at least one the functions of power management of each device, distributed reservation and synchronization among wireless devices of an ad hoc network, are facilitated. It should be noted that the network illustrated in FIG. 3 is small for purposes of illustration only. In practice, WLANs or WPANs may include a much larger number of wireless devices incorporating the present invention.

Referring now to FIG. 4, each device 301 within an ad-hoc network, as illustrated in FIG. 3 may, include a MAC module 400 with an architecture that is illustrated in the block diagram of FIG. 4. Each device 301 may include a MAC module 400 having controller 402 coupled to at least a transmitter 401, a slotted Beacon processing component 403 according to the present invention, and a receiver 404. The transmitter 401 and the receiver 404 are coupled to an antenna 405. The slotted Beacon processing component 403 provides adaptive programming such that, for example, the Beaconing Period length is adapted to various communication protocols including IEEE 802.11, Bluetooth, and any other protocol supporting ad-hoc wireless networks known in the art. By way of example only, in IEEE 802.11 an IBSS is an ad-hoc network to which the present invention is applicable. An ad-hoc network is started by a given station (STA) configured for ad-hoc operation "looking" for Beacons containing a network name (SSID) matching one that is configured. When Beacons with matching SSIDs are received by a given STA and are issued by another STA operating in ad-hoc network mode, the given STA joins the network, i.e., WLAN, of the other STA. When no Beacons are received with matching network name, the STA will issue Beacons itself to establish an ad-hoc network having the configured SSID.

Referring now to FIG. 5, a finite state diagram (FSD) is illustrated for a synchronization functionality of the slotted Beacon processing component 403. A device wakes up prior to TBTT 501 and/or performs checking for Beacon(s) 502. Either at least one Beacon is received or no Beacon is received and the device transitions from the checking state 502 to a checking for Beacon slot state 503 or an ad-hoc network establishing state 504, respectively. Once in the checking for Beacon slot state 503 the device transitions to a synchronizing state 506 if an empty Beacon slot is available. After synchronizing, the device may transmit data if data is in the queues (507) or may go to sleep and wake up before the next TBTT or BPST again (501). If there is data in the queues (507), the device can go to sleep (505) once all data has been delivered. If no slots are available, the device can establish a second ad-hoc network with a new Beacon Period (504), or it can go to sleep until the next superframe (505). Alternatively, if the device does not receive any Beacon it can establish the ad-hoc network by setting the TBTT or BPST, etc 504.

Referring now to FIG. 6, a finite state diagram (FSD) is illustrated for Beacon collision detection and resolution (BCRP) of the slotted Beacon processing component 403. Assume that a device has performed the synchronization function from FIG. 5 and established an ad-hoc network (504) or has synchronized with an existing ad-hoc network (506). The BCRP FSD starts with a device choosing an empty slot 601 in the Beaconing Period. The device waits for the TBTT or BPST 602 and sends a Beacon in the chosen idle slot, including the BPOIE calculated from the previous superframe 603. During the Beaconing Period, the device receives Beacons, if any, from other devices in the Beaconing group (BG) 604 and saves the DEVID of the Beacon transmitters 605. These DEVIDs, together with the slot numbers, are included in the BPOIE in the transmitted Beacon of the next superframe 603. The BPOIEs from received Beacons are also decoded 606.

In parallel, the device performs the operation of marking slots busy/idle 606. All slots where a Beacon has been received or included in received BPOIEs are marked as busy. Slots that were marked as busy are changed to idle if a Beacon has not been received in the slot during a predetermined number N of consecutive superframes and the slot information has not been included in BPOIEs received from any device in the same Beaconing group during a predetermined number N of consecutive superframes.

The BCRP continues by examining the received BPOIEs. If the device's own DEVID has been included in all received BPOIEs, the device proceeds to normal operation and waits for the next TBTT or BPST 602. If its own DEVID is missing from one or more BPOIEs, a counter (which is maintained for each BPOIE) is incremented by the device, indicating the number of consecutive superframes that its own DEVID has been missing from that particular BPOIE 607. If the DEVID has been missing from a particular BPOIE for more than a predetermined number N of superframes, the device chooses a new slot 601 and restarts the process. Otherwise, the device waits for the next TBTT or BPST 602.

While the preferred embodiments of the present invention have been illustrated and described, it will be understood by those skilled in the art that the superframe as described herein is illustrative and various changes and modifications may be made to the superframe and equivalents may be substituted for elements thereof without departing from the true scope of the present invention. In addition, many modifications may be made to adapt the teachings of the present invention to a particular situation without departing from its central scope, e.g., the position of the Beaconing Period may different from the example start of a superframe. Therefore, it is intended that the present invention not be limited to the particular embodiments disclosed as the best mode contemplated for carrying out the present invention, but that the present invention include all embodiments falling with the scope of the appended claims.

We claim:

1. A method for a beaconing protocol for a device to participate in an ad hoc communications network of devices, comprising:
    a. dividing medium access time into a periodic sequence of at least one superframe beginning at a given start time and having a next superframe of the periodic sequence at any point in time;
    b. partitioning the superframe into a slotted beaconing period having a plurality of contiguous beacon slots followed by a data transfer period;
    c. performing at least one of
       starting a new ad hoc network by performing (a)-(f),
       occupying an idle beacon slot of the plurality of contiguous beacon slots, and
       sleeping until the start of the next beaconing period and then waking up and repeating (c);
    d. beaconing by the device at said occupied beacon slot;
    e. receiving data transmissions from the other devices during the data transfer period;
    f. transferring data to the other devices during the data transfer period.

2. The method of claim 1, wherein the beaconing further comprises:
    transmitting a beacon comprising at least one set of information selected from the group consisting of device identification information and capabilities, a traffic identification map (TIM), a beacon slot occupancy field, related mesh network, and distributed reservations of the medium.

3. The method of claim 2, further comprising:
    receiving other beacons from other devices during the slotted beaconing period of a superframe, said other beacons comprising at least one set of information selected from the group consisting of device identification information and capabilities, a traffic identification map (TIM), a beacon slot occupancy field, related mesh network, and distributed reservations of the medium; and
    wherein the beaconing further comprises including in the device's own beacon information at least one set of information selected from the group consisting of device identification information and capabilities, a traffic identification map (TIM), a beacon slot occupancy field, related mesh network information, and reservations of the medium.

4. The method of claim 3, further comprising discovering the other devices during the time of one superframe once the other beacons have been received.

5. The method of claim 3, further comprising:
    waking up at the start of the next superframe;
    if a TIM of any of the received other beacons is addressed to the device, performing:
       i. remaining awake during the data transfer period of the superframe if the TIM is not clear,
       ii. going to sleep during the data transfer period of the superframe when the TIM is clear; and
       iii. going to sleep if a data frame is received during the data transfer period of the superframe with a "More Data" bit set to zero.

6. The method of claim 3, further comprising:
    receiving information in other beacons regarding the neighborhood of the device; and
    using the information received regarding the neighborhood of the device to find a transmission path based on a criteria selected from the group consisting of fewest hops and least cost.

7. The method of claim 3, further comprising:
    from the slot occupancy information in the received beacon, determining for each beacon slot of said plurality of contiguous beacon slots if the beacon slot is one of idle and received incorrectly;
    if, for a pre-determined number of consecutive superframes, the beacon slot occupied by the device is determined to be one of idle, received incorrectly, and comprising an information of another device, then a collision is deemed to have occurred in the beacon slot occupied by the device and the device performs step (c) to resolve the collision.

8. The method of claim 3, wherein:
    the transferring further comprises transferring data during the data transfer period corresponding to a reservation of the medium transmitted in the device's own beacon; and
    the beaconing further comprises retaining the reservation of the medium until the data transfer is completed.

9. The method of claim 8, wherein the reservation of medium access during the data transfer period of a superframe is based on one of the reservation mechanisms selected from the group consisting of an enhanced distributed channel access (EDCA) mechanism and a distributed reservation mechanism.

10. The method of claim 1, wherein:
    the superframe comprises a first pre-determined number of medium access slots having a first pre-determined length;
    said slotted beaconing period comprises a second pre-determined number of medium access slots such that each medium access slot consists of an identical third pre-determined number of beacon slots followed by a space greater than a fourth pre-determined number; and
    said data transfer period comprises a remaining number of medium access slots equal to the difference between the first pre-determined number and the second pre-determined number.

11. The method of claim 10, wherein:
    said first pre-determined number is 256;
    said first pre-determined length is 256 usec such that the superframe has a length of 65 msec;
    said second pre-determined number is 24;
    said third pre-determined number is 3; and
    said fourth pre-determined number is equal to the length of a short interframe space (SIFS).

12. A slotted beaconing apparatus for an ad hoc network device, comprising:

a receiver for receiving beacons and data transfers from other ad hoc network devices;

a transmitter for transmitting the device's own beacons and data;

a slotted beacon processing component that processes received beacons and received data transfers and the device's own beacons and the device's own data transfers for transmission;

a controller operatively coupled to said slotted beacon processing component and configured to divide a medium into a sequence of at least one superframe comprising a slotted beaconing period and a data transfer period, to process beacons and data received respectively therein, and format and control the device's own beacons and the device's own data to be transmitted respectively therein;

said receiver and transmitter are configured to respectively control receipt and transmission of beacons thereby during said slotted beaconing period and to respectively control receipt and transmission of data during said data transfer period.

13. The apparatus of claim 12, wherein:

the at least one superframe comprises a first pre-determined number of medium access slots having a first pre-determined length;

said slotted beaconing period comprises a second pre-determined number of medium access slots such that each medium access slot consists of an identical third pre-determined number of beacon slots followed by a space greater than a fourth pre-determined number; and said data transfer period comprises a remaining number of medium access slots equal to the difference between the first pre-determined number and the second pre-determined number.

14. The apparatus of claim 13, wherein:

said first pre-determined number is 256;

said first pre-determined length is 256 usec such that the superframe has a length of 65 msec;

said second pre-determined number is 24;

said third pre-determined number is 3; and said fourth pre-determined number is equal to the length of a short interframe space (SIFS).

15. The apparatus of claim 12, wherein a beacon comprises at least one set of information selected from the group consisting of device identification information and capabilities, a traffic identification map (TIM), a beacon slot occupancy field, related mesh network information, and distributed reservations of the medium.

16. The apparatus of claim 15, wherein the controller is further configured to:

wakes up at the start of the next superframe;

if a TIM of any received beacons is addressed to the device:
  i. remain awake during the data transfer period of the superframe if the TIM is not clear,
  ii. goes to sleep during the data transfer period of the superframe when the TIM is clear; and
  iii. goes to sleep if a data frame is received during the data transfer period of the superframe with a "More Data" bit set to zero.

17. The apparatus of claim 12, wherein other devices are discovered during the time of one superframe once at least one other beacon has been received.

18. The apparatus of claim 17, wherein:

information is received in other beacons regarding the neighborhood of the device; and the information received regarding the neighborhood of the device is used by the controller to direct the transmission of data via a path based on a criteria selected from the group consisting of fewest hops and least cost.

19. The apparatus of claim 12, wherein the controller is further configured to:

determine from the slot occupancy information in the received beacon, which beacon slots are one of idle and received incorrectly;

if, for a pre-determined number of consecutive superframes, the beacon slot occupied by the device is determined to be one of idle, received incorrectly, and comprises an information of an other device, deem that a collision has occurred in the beacon slot occupied by the device, and direct the slotted beacon processing component to resolve the collision according to a pre-determined collision resolution mechanism.

* * * * *